July 7, 1970      O. W. LEADERS      3,519,206
TRAVELING WATER SUPPLY FOR FIELD IRRIGATION SYSTEM
Filed Nov. 20, 1968      2 Sheets-Sheet 1
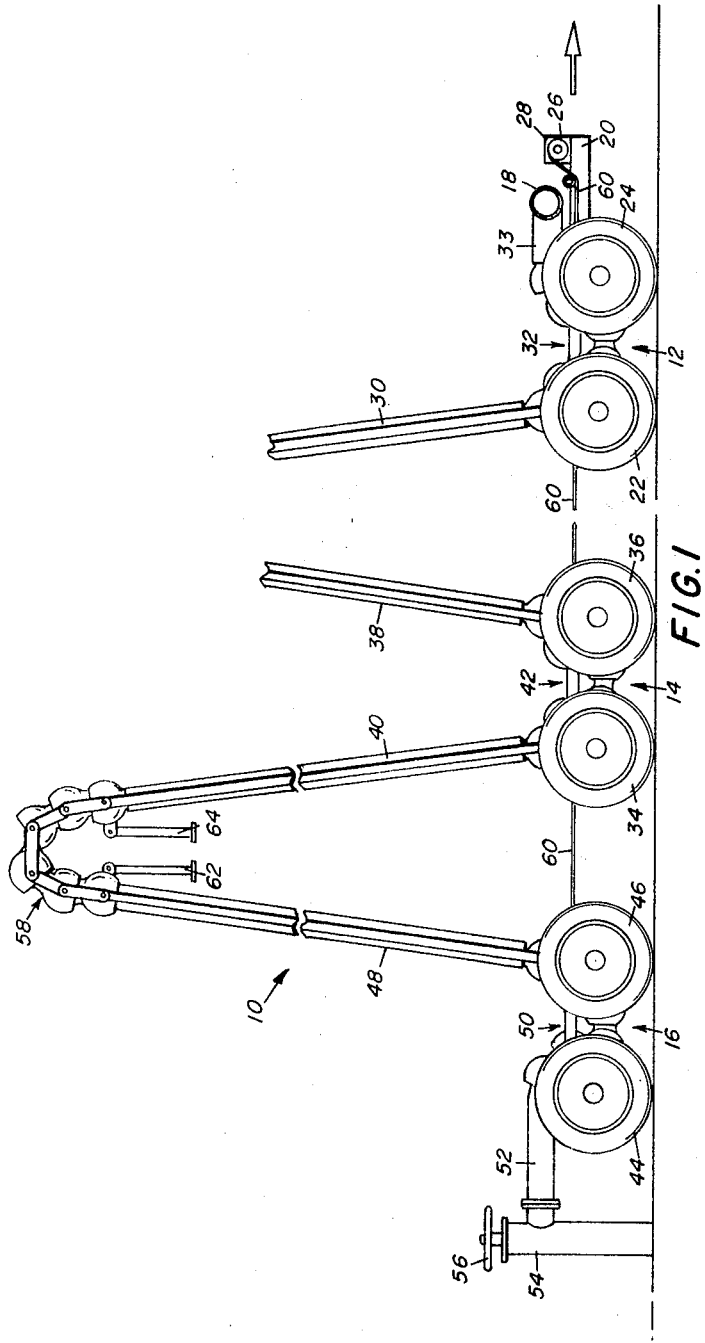
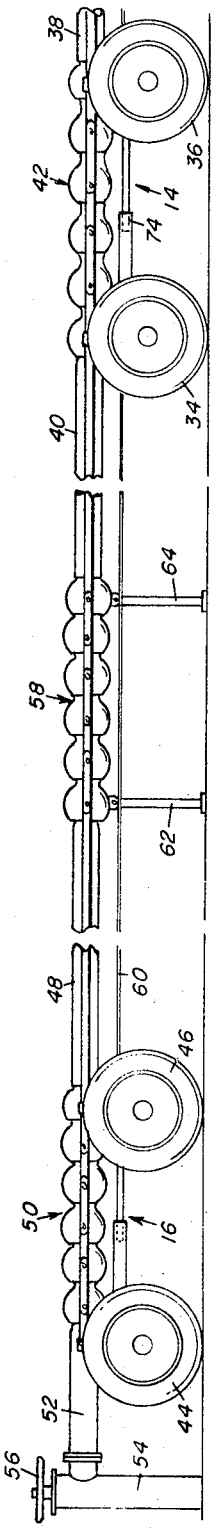
INVENTOR
OTTO LEADERS
BY *Blakland Jones*
ATTORNEYS July 7, 1970  O. W. LEADERS  3,519,206
TRAVELING WATER SUPPLY FOR FIELD IRRIGATION SYSTEM
Filed Nov. 20, 1968  2 Sheets-Sheet 2

INVENTOR
OTTO LEADERS
BY Beall and Jones
ATTORNEYS

United States Patent Office 3,519,206
Patented July 7, 1970

3,519,206
TRAVELING WATER SUPPLY FOR FIELD
IRRIGATION SYSTEM
Otto W. Leaders, Ottertail, Minn. 56571
Filed Nov. 20, 1968, Ser. No. 777,356
Int. Cl. B05b 1/20
U.S. Cl. 239—213                                    9 Claims

ABSTRACT OF THE DISCLOSURE

A system is disclosed for supplying water under pressure to a traveling sprinkler system. A series of wheeled carriage units are provided on which are mounted sections of piping for carrying water from a stationary source to the moving sprinkler system. The pipe sections are connected by flexible joints which permit the sections to be vertically folded and then to extend as the sprinkler moves away from the water source. When the pipes reach their full extent, the system may be refolded, as by a motor driven winch for connection to a new water source and the process repeated.

BACKGROUND OF THE INVENTION

The present invention relates, in general, to irrigation systems and, more particularly, to a pipeline system for supplying water to a movable sprinkler system.

At the present time, it is common practice in irrigating large fields of row crops to provide a traveling sprinkler system which consists of a lateral water pipe extending the entire width of a field with distribution heads spaced along the pipe. The pipe is normally supported by A-frames on wheels which advance from one end of the field to the other, providing overhead sprinkler irrigation to the crops. Water must be supplied to these lateral sprinklers by pumping it from a source such as an underground well, a river or a reservoir, through main pipes, and from the main pipes into the lateral pipes.

Numeruos methods have been devised for supplying water to these lateral sprinklers. Initially, the sprinklers were held stationary during the sprinkling operation, and upon completion of watering a given area, the water supply was turned off, the sprinkler system was moved to the next station, reconnected and the water started again. An improvement on this system was the provision of means for moving the lateral sprinkler system continuously during the watering operation, but this presented the problem of maintaining a connection between the stationary supply and the moving sprinkler. At the present time, the system generally in use involves following the sprinkler with a trailer full of quick coupling pipe sections, periodically shutting down the sprinkler and adding pieces of pipe to permit the sprinkler to continue moving. This system involves a considerable amount of manual labor, which is expensive, as well as requiring that the system be shut down periodically.

It has been proposed to solve this problem by providing a supply of horizontally folding pipes, with the stack of pipes unfolding one at a time as the lateral sprinkler moves away from the stationary source. Although this solution is an improvement over the presently used systems, the outer pivot points of the pipes require support wheels such as casters to allow easy folding and unfolding of the pipes. The wheels are particularly needed if the length of pipes are to be sufficiently long to permit a reasonable extent of the sprinkler system between connections. The requirement for such support wheels, however, renders such a system unsatisfactory for row crops, for such wheels will travel in a generally arcuate path as the supply pipes unfold, thus inevitably ruining some of the row crops.

SUMMARY OF THE INVENTION

In order to overcome the disadvantages of the prior art systems and thus to provide an irrigation system requiring a minimum amount of shut down time and a minimum amount of labor in transferring the sprinkler from one source to the next, the present invention provides a vertically foldable supply system mounted on a series of wheeled carriages, or trailers, suitable for traveling through a field of row crops without damaging the crops. At each trailer, and midway between each trailer, is a water-tight flexible joint which allows the sections of pipe to extend and to be contracted vertically, while conducting water under pressure.

As in prior systems, the water supply is brought to the field to be irrigated by an underground water main having hydrant valves spaced along the main, to which the sprinkler piping system may be coupled. The water main runs the length of the field, in its center, and is of sufficient size to carry large quantities of water. The supply side of the piping system of the present invention is attached to a selected hydrant by means of a short length of flexible hose, while the discharge end is attached to the traveling lateral. This lateral is connected at right angles to the axis of the sprinkler carriage and to the line of advance of the system. The carriage units are drawn up adjacent one another whereby the pipe sections are folded to an almost vertical position. Water pressure of about 100 p.s.i. is applied to the system, the pipes of which may have an inner diameter of about 8 inches, and the sprinkler begins to operate. As the sprinkler lateral advances, the supply carriages and the vertically extending supply pipes which they carry gradually move apart, extending the pipes until the piping system is fully extended, at which point the sprinkler has advanced down the field to the location of the next hydrant. Support means are provided at the intermediate flexible joints to prevent the joints from collapsing or sagging below a point somewhat above horizontal. This support means prevents the joints from locking and permits the system to be folded again. When the rig has reached the fully extended position, the water supply is uncoupled and by means of a gasoline-powered winch mounted on one of the carriage units, the device is folded by hauling the rear unit up to the location of the leading, or sprinkler, unit. This causes the supply piping to fold in accordian fashion, and the operation may be repeated at the next hydrant.

A vertically folding piping system such as that disclosed herein has numerous advantages over prior methods of feeding a sprinkler lateral, in addition to those mentioned above. For example, the vertical arrangement of the supply piping has, by reason of its weight, a natural tendency to extend, thereby aiding in the advancement of the sprinkler system. This factor reduces the energy expended in the drive mechanism for the sprinkler carriage, which normally is driven by a water-powered motor. Where the ground slope is favorable, the weight of the supply piping may be sufficient to extend the system, with the rate of advance being controlled by a timed release of the winch cable, for example. On the other hand, water powered motors or other drive mechanisms may be required on more than one carriage to advance the system up a slope.

The ball joints used to interconnect the adjacent pipe sections provide necessary flexibility to the pipes of the system to permit them to be folded without introducing abrupt changes into the direction of water flow. Such changes in direction result in substantial losses in water pressure, and thus are undesirable. The joints described herein comprise a plurality of ball and socket elements, adjacent elements of the joint being restricted in movement to about 30° from the joint axis, whereby a series of elements is required to attain a 180° turn. This arrangement, together with the bevelled inner surfaces of the elements, provides a smooth flow path that does not appreciably interfere with the water flow. To provide even smoother flow, a sleeve may be fitted within the bore of the joint which will provide turbulence-free water flow. The ball joints may be constructed to fit into corresponding sockets, and may have flexible sealing means to prevent water leakage. The ball and socket junction normally will be sufficiently strong to bear the stresses of flexure and of drawing the support carriages during extension of the system, but if desired they may be strengthened by the use of corresponding flexible support links or other suitable structures.

It is contemplated that where lightweight piping which is not self-supporting is used in the system, support brackets or arms may be pivotally mounted on the carriages to strengthen the pipes. The particular manner in which the piping is mounted on the carriages, or in the way that the carriages are constructed, is dependent upon the fact that as the two pipe sections mounted on a single carriage move between their vertical and horizontal positions during folding and unfolding of the system, the horizontal vector representing the length of the pipe joint changes. This means that the two pipe sections must be movably mounted on the carriage or that the length of the carriage must change to accommodate the variation in length of the joint carried by the carriage. The present disclosure illustrates one method of constructing the system to accommodate this type of joint, but other methods will be apparent to those skilled in the art.

BRIEF DESCRIPTION OF THE DRAWING

The foregoing and other objects, features and advantages of the invention will become apparent from a consideration of the following detailed description of a preferred embodiment thereof, taken with the accompanying drawings, in which:

FIG. 1 is a diagrammatic illustration of a piping system in accordance with the present invention, showing the system in a folded position;

FIG. 2 is a view of the system of FIG. 1 in its extended position;

DESCRIPTION OF A PREFERRED EMBODIMENT

Figure 3:
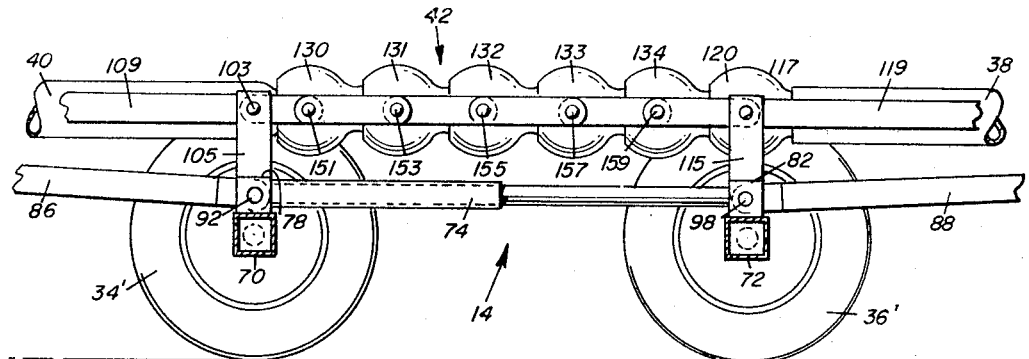
FIG. 3 is a side view of a typical carriage unit.

Referring now to FIG. 1, there is illustrated generally at 10 a water supply unit constructed in accordance with the present invention. The illustrated unit comprises a plurality of carriages 12, 14 and 16 adapted to support the foldable pipe sections which make up the piping for the supply system. The lead carrier 12 carries the sprinkler lateral which is indicated generally at 18 and which is constructed in known manner. The carriage comprises a frame 20 mounted on wheels 22 and 24, the frame supporting the sprinkler lateral 18 and other equipment which may be required. For example, a water-powered motor (not shown) may be provided to drive the carriage, the motor being connected through a suitable drive mechanism to the wheels. However, since such motors are well known, no showing is deemed necessary here. The frame may also carry a winch 26 driven by a gasoline engine 28 for purposes to be described below.

A pipe section 30 is supported at the rear of carriage 12 and is connected to the sprinkler lateral through flexible ball joint arrangement 32 and hose 33, either directly or by way of the above-described motor. Carriage 12 is powered to draw the sprinkler system along a predetermined path, thereby moving the lateral with its distributor heads along the field to be irrigated and drawing after it the water supply piping carried by the remaining carriages. The speed of carriage 12 is regulated in accordance with known principles to insure that the crops being irrigated receive a sufficient quantity of water.

Carriage 14 is typical of the pipe carriers intermediate the lead carriage 12, which carries the sprinkler, and the rear trailer 16, which is attached to the stationary water supply. Carriage 14 comprises a frame on which wheels 34 and 36 are mounted and which carries piping sections 38 and 40. The piping sections 38 and 40 are joined at their lower ends by a multiple ball joint 42 which permits the piping sections to move between a substantially vertical and a substantially horizontal position as the water supply system is extended. Carriage 14, and others like it which carry the intermediate piping sections, normally is not powered, but is drawn along the path of the lead carriage 12 by the motor on carriage 12. It will be apparent, however, that if desired a water driven motor may be provided on one or more of the intermediate carriages. This latter arrangement would be particularly advantageous where the area being irrigated is not level.

The rear carriage 16 also includes a frame which is supported by wheels 44 and 46. The frame carries the last piping section 48 which is connected by way of multiple ball joint 50 and flexible pipe 52 to a stationary hydrant 54. Hydrant 54 is connected to an underground water main (not shown) and water flow to flexible pipe 52 is controlled by a valve 56.

The pipe sections between adjacent carriages, such as pipe sections 40 and 48 on adjacent carriages 14 and 16, are connected at a point intermediate the two carriages by a multiple ball joint 58 which permits the pipe sections to be folded as the carriages are drawn together and the piping sections assume the substantially vertical position illustrated in FIG. 1. The intermediate ball joints 58 together with the carriage ball joints 42 and 50 provide sufficient flexibility to the piping system to enable the carriages to be drawn up adjacent one another, with the pipe sections 40 and 48 being substantially vertical. Since each element of the ball joints provides only a limited amount of flexibility, a certain amount of spacing is required between pipe sections, such as sections 40 and 48, when they are folded, and this spacing dictates the particular mounting points of the pipes on their respective carriages, as well as dictating the minimum sizes of the carriages. Cable 60 extends from winch 26 on the lead carriage to a fixed point on the last carriage 16, whereby operation of the winch will draw trailer 16 toward carriage 12, and bring with it the intermediate carriages, while release of winch 26 permits extension of the piping system. The cable may also act as a guide for the intermediate carriages.

Although only one intermediate carriage 14 is illustrated in FIG. 1 it will be apparent that any desired numbers of carriages may be included, depending upon various factors such as the size of the field to be irrigated, the length and sizes of the pipe sections, the contour of the land over which the device must travel, and the like.

The device of FIG. 1 is illustrated in its extended position in FIG. 2, wherein elements common to FIG. 1 are identified by the same numerals. In order to prevent the system from extending so far that the intermediate ball joint 58 is permitted to sag below the horizontal, a pair of supporting legs 62 and 64 are pivotally mounted on either end of the ball joint. If the pipes 40 and 48 were permitted to fall below the horizontal, then, upon actuation of the winch 26, pipes 40 and 48 would tend to fold downwardly instead of upwardly. Legs 62 and 64 are thus designed to be sufficiently long to maintain a slight upward slope on each of pipes 40 and 48, thus assuring easy folding of the piping system.

Figure 4:
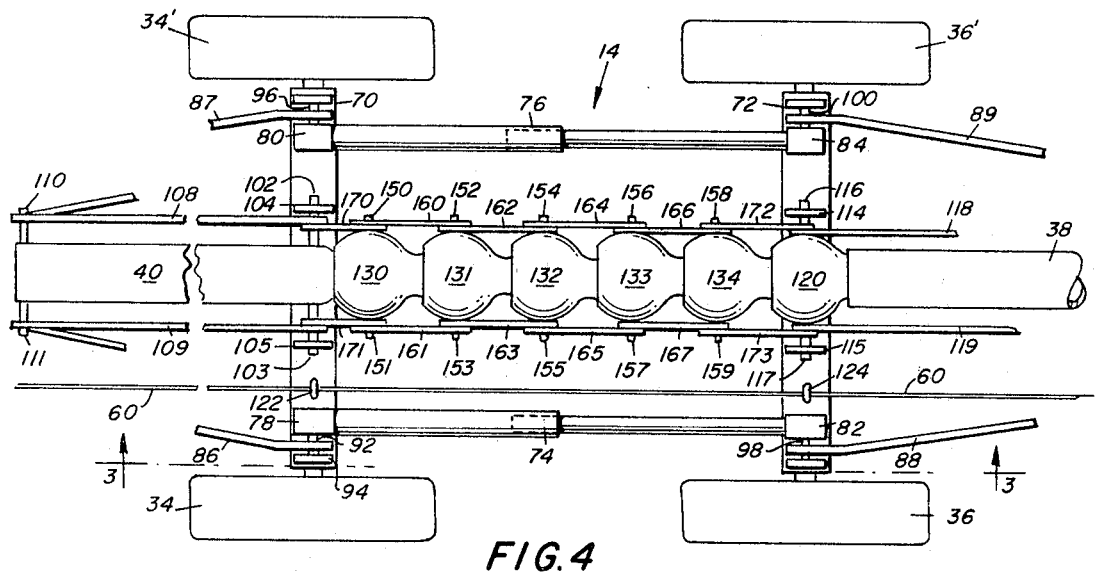
FIG. 4 is a top view of the carriage unit of FIG. 3.

FIGS. 3 and 4 illustrate side and top views respectively of a typical carriage such as the carriage 14 of FIG. 1, with FIG. 3 being a partial sectional view taken along lines 3—3 of FIG. 4. Carriage 14 is mounted on wheels 34, 34' and 36, 36' which are mounted on corresponding axles extending from frame cross members 70 and 72. Cross members 70 and 72 are interconnected by means of longitudinal telescoping arms 74 and 76 which permit the horizontal distance between wheels 34 and 36 to be varied as the pipe assembly is flexed or extended. Although telescoping frame members are illustrated in this embodiment, it will be apparent that this arrangement is only one of many that could provide the required variation in horizontal distance between the ends of the flexible joint 42 which are pivotally mounted on the cross frame members as illustrated. Arms 74 and 76 are mounted to cross member 70 by means of blocks 78 and 80, respectively, and are mounted to cross member 72 by blocks 82 and 84, respectively. These blocks, which are fixed to their corresponding cross frame members, assist in the support of pivotally mounted struts 86, 87, 88 and 89 which support the pipe sections 38 and 40 carried by carriage 14. Strut 86 is mounted on a pin 92 mounted between block 78 and a corresponding pin support block 94. This strut extends from the cross frame member 70 to support pipe section 40. Strut 87 is pivotally mounted in similar manner to a pin 96 and also supports pipe section 40. Struts 88 and 89 are pivotally mounted on pins 98 and 100, respectively, and support pipe section 38.

Pipe section 40 is pivotally mounted at its lower or carriage end by means of pivot pins 102, 103 journalled in support posts 104, 105, respectively, which are mounted on cross member 70. These pins are axially aligned with pins 92 and 96 to provide a common pivot axis for the pipe section and its supporting struts. Also mounted on pins 102 and 103 are additional pipe support arms 108, 109, respectively, which extend the full length of pipe section 40 to support it at its upper end by means of pins 110, 111. Pipe 40 may be a conventional irrigation pipe connected at its upper and lower ends to fittings adapted to receive the ball and socket joints which permit flexure at the carriage and at the intermediate points, or may be specially molded at each end so as to form a part of a ball and socket joint. It is this latter structure that is illustrated in FIGS. 3 and 4 for pipe section 40.

Pipe section 38 is mounted on cross member 72 in the same manner that pipe 40 is mounted to cross member 70; that is, by means of support posts 114 and 115 and support pins 116 and 117. Pipe support arms 118 and 119 are pivotally mounted on pins 116 and 117, respectively, to cooperate with struts 88 and 89 in supporting pipe section 38. In this illustration, however, pipe 38 is shown as a length of standard irrigation pipe connected to a fitting 120 to which the pivot pins 116 and 117 are connected. This fitting receives the conventional irrigation pipe 38 without flexure at the junction thereof, the fitting being adapted at its opposite end to receive the flexible joint indicated generally at 42, to be described.

Cable guides 122 and 124 are mounted on cross members 70 and 72, respectively, to loosely receive cable 60, described above. If desired, a duplicate cable may be provided on the other side of the piping in order to insure that the trailing carriage 16 (FIG. 1) is drawn up evenly when the apparatus is being folded.

Turning now to the flexible joints which make the folding pipe system of the present invention practical in terms of water flow and maintenance of pressure, the joint 42 which is mounted on carriage 14 may be considered as typical. This carriage joint is comprised of a plurality of ball and socket segments, or elements 130, 131, 132, 133 and 134, some of which are shown in cross section in FIG. 5. As illustrated in this figure, each element comprises a socket portion such as that indicated at 136 for element 131, and a ball portion 138. Socket portion 136 is hollow, with an internal cavity adapted to receive the ball portion of an adjacent element. Similarly, the ball portion 138 of element 131 has an outer diameter which enables it to fit within the socket cavity of adjacent element 132. The socket cavity of element 131 tapers into a bore 140 which extends through ball portion 138 to provide a flow path through the joint element. Bore 140 is flared at 142 to prevent the peripheral edge of the bore from interfering with the free flow of water from one segment to the next even when the joint is flexed to its fullest curvature. With no edges being exposed to the flow of water through the joint, turbulence is reduced, as are friction and consequent pressure losses.

Each of the joint elements, or segments, are identical, with the ball and socket sizes preferably being arranged so that the ball portion of each segment snaps into the socket cavity of the next adjacent segment to produce coaxial segments forming a movable joint. The exterior curvature of the ball portion of each element forms a neck 144 which is shaped so as to permit pivotal movement of one segment with respect to its adjacent segment. Preferably, the degree of relative movement between adjacent first and second segments is restricted to about 30°; that is, if the first segment is held stationary, the ball and socket joint formed between the first and second segments permits the axis of the second segment to be moved 30° away from the axis of the first, stationary segment. With this degree of movement, six such ball and socket joints are required to produce a joint which is capable of carrying water through a full 180° turn such as is necessary when the piping system of the present invention is in its folded stage.

The flexible ball joint element may be composed of aluminum, fiber glass, nylon or the like and may be formed by molding, for example. If desired, sealing rings or the like may be included in the ball joints to prevent leakage. Alternatively, leakage may be avoided by inserting within the bore formed through the flexible joint a nylon sleeve, indicated by the dotted lines at 146. This sleeve would not be self-supporting, but would merely act as a lining for the joint bore, with the ball joints providing the structure and strength. Such a sleeve would also serve to eliminate any slight turbulence that might be caused by the internal surface shape of the ball joint.

If it is found that in a particular application the snapping together of adjacent joint segments does not provide sufficient strength in the joint to permit its use under the degree of tension required, the strength of the joint may be increased in numerous ways. One method would be to provide an adjustable opening for the socket portion of the joint element. This would permit the opening to be enlarged for the reception of the ball portion of the adjacent element and thereafter be made smaller to prevent removal of the ball portion. Such a construction might include, for example, a plurality of slots formed around the periphery of the socket opening with a strap or cable fastened around the outside surface of the socket portion. Tightening of the cable would then serve to squeeze together the slots to reduce the diameter of the socket opening.

A second method of strengthening the flexible ball joint is illustrated in FIGS. 3 and 4, wherein each segment of the joint is provided with a pair of pins which receive links extending between adjacent segments. These links absorb the tension exerted on the joint while permitting it to retain its flexibility. As illustrated in FIG. 4, segment 130 carries on opposite sides pins 150 and 151 which are connected to the segment in a suitable manner. For example, these pins may be molded as a part of the segment during its manufacture. In similar manner, segment 131 carries pins 152 and 153, segment 132 carries pins 154 and 155, segment 133 carries pins 156 and 157 and segment 134 carries pins 158 and 159. Links 160 and 161 join segments 130 and 131, with link 160 extending between pins 150 and 152 and link 161 extending between pins 151 and 153. In similar manner, links 162–167 connect segments 131–134 by means of corresponding pins. These pins are located on the joint segments in alignment with the line where the ball of one segment contacts the socket cavity of the adjacent segment for pivotal motion. This insures that the pivot axis of the links will correspond to that of the joint segments and flexibility of the joint will not be impaired.

The joint is connected to the cross member 70 of the carriage by means of links 170 and 171, which connect joint segment 130 to pins 102 and 103, respectively. Links 172 and 173 connect joint segments 134 to cross member 72 by way of pivot pins 116 and 117, respectively.

Although the interconnection of the joint segments is illustrated only with respect to the carriage joint 42, it will be apparent that a similar link connecting apparatus may be provided for each of the flexible joints used in the system, if desired. It will also be apparent that the links herein illustrated are merely one type of structure that is suitable for this purpose, and various alternatives may be used. For example, the links may be replaced by a length of cable connected to each of the corresponding pins to effectively relieve the tension on the joint.

Figure 5:
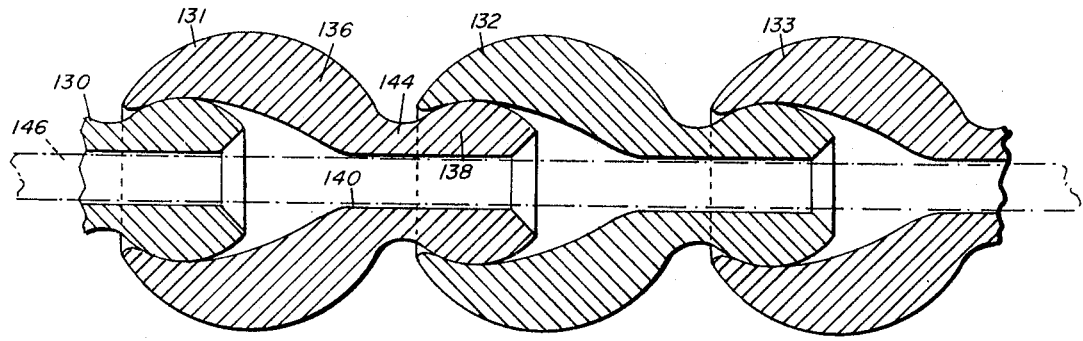
FIG. 5 is a sectional view of the multiple ball joint connection used in the piping system of the invention.

It will be seen from a study of FIGS. 3-5 that as the piping system is folded, adjacent pipe sections such as 38 and 40 will pivot about the points at which they are connected to carriage 14. Thus, as viewed in FIG. 3 pipe section 40 will pivot clockwise about the axis defined by pins 102, 103, and pipe section 38 will pivot counter-clockwise about the axis defined by pins 116, 117. This will cause the pipe joint 42 to flex downwardly, with adjacent segments pivoting with respect to one another. The joint will flex in a vertical plane from the straight-line arrangement. Each segment will form a 30° angle with its adjacent segment, and with six flex points, corresponding to pins 103, 151, 153, 155, 157 and 159 in FIG. 3, a 180° turn can be made. Changing the joint from a straight line to a curve, however, necessarily reduces the horizontal distance between the ends of the joint; i.e., between pins 103 and 117 (FIG. 3). This reduction in distance requires that the carriage frame be so constructed as to accommodate this motion, and it is for this purpose that telescoping arms 74 and 76 are provided. It will be apparent that other methods of accommodating this variation may be provided; for example, this carriage frame may be arranged to support the joint at a single central location, with the pipe support arms and struts being pivoted from a corresponding axis. In such a case, the struts may be slidably connected to the pipe support arms to account for changes in length due to flexure of the joint.

Although the present invention has been described in terms of a specific embodiment, it will be apparent to those skilled in the art that numerous modifications other than those already suggested may be made without departing from the true scope of the invention. Thus, for example, the ball joint arrangement is illustrative of many flexible joints that may be used in a vertically folding pipe ststem. Further, the system need not be used at relatively high water pressures, but may utilize a low pressure supply in a seepage irrigation system as well as a high pressure sprinkler type of distribution. Further, in appropriate circumstances it may not be required to use an extensive lateral for irrigation of land, but high pressure spraying heads might be located on or around the lead carriage for water distribution. Thus, the term irrigation distributor in the following claims has reference to the various types of watering heads that may be used in the present system. In the preferred mode, however, the system utilizes ball joints and a sprinkler lateral with the foldable system of the invention. Therefore, it is desired that the present invention not be limited to the disclosed embodiment, but that its true scope be restricted only by the following claims.

I claim:
1. A piping system for supplying water from a stationary source to a movable irrigation distributor, comprising a plurality of movable carriage units, each said carriage unit supporting a pair of pipe sections for motion between generally horizontal and generally vertical alignments, first flexible joint means on said carriage connecting said pair of pipe sections, and second flexible joint means intermediate each said carriage unit for connecting corresponding pipe sections, whereby said piping system may be folded and then extended to move said irrigation distributor.

2. The piping system of claim 1, further including cable means for folding said piping system by drawing said carriage units closely adjacent each other and means for extending said piping system during sprinkling by moving said carriage units apart, said pipe sections folding and unfolding in a generally vertical plane during operation of said system.

3. The piping system of claim 2, wherein each said carriage unit comprises a frame supported by wheels, said carriage units following a single track, whereby said system may be used for irrigating row crops.

4. The piping system of claim 3, further including a lead carriage unit adapted to carry said irrigation distributor, said lead carriage unit supporting a single pipe section connected to said distributor and to a following carriage unit by means of flexible ball joints.

5. The piping system of claim 1, wherein each said flexible joint means comprises a plurality of joint segments, adjacent segments being connected for limited relative motion whereby said flexible joints provide a gradually curved connection between pipe sections.

6. The piping system of claim 5, wherein said adjacent segments are ball and socket elements forming a flexible ball joint, said relative motion between adjacent segments of each said flexible ball joint is limited to 30°, whereby at least six segments are required for each 180° folding joint in said piping system.

7. The piping system of claim 5, wherein each said joint segment comprises a ball portion and a socket portion, said socket portion including a cavity adapted to receive the ball portion of an adjacent segment, said cavity tapering into a bore which extends through said ball portion and which is flared to reduce flow turbulence when said joint is flexed.

8. The piping system of claim 7, further including means for holding said joint segments in an assembled position to form a joint flexible in only one plane.

9. The piping system of claim 1, further including strut means pivoted on each of said carriage units for supporting each of said pipe sections.

References Cited

UNITED STATES PATENTS

| 2,628,863 | 2/1953 | Maggart | 239—179 |
| 2,652,282 | 9/1953 | Willetts | 239—213 X |

FOREIGN PATENTS

| 1,524,949 | 5/1967 | France. | |

M. HENSON WOOD, Jr., Primary Examiner

J. J. LOVE, Assistant Examiner

U.S. Cl. X.R.

137—344; 138—119; 239—189, 191